(12) United States Patent
Cimecioglu et al.

(10) Patent No.: US 6,695,950 B1
(45) Date of Patent: Feb. 24, 2004

(54) ALDEHYDE MODIFIED CELLULOSE PULP FOR THE PREPARATION OF HIGH STRENGTH PAPER PRODUCTS

(75) Inventors: A. Levent Cimecioglu, Princeton, NJ (US); Danielle E. Harkins, Neshanic Station, NJ (US); Michele Merrette, Bridgewater, NJ (US); Robert D. Rossi, Levittown, PA (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 251 days.

(21) Appl. No.: 09/638,319

(22) Filed: Aug. 14, 2000

Related U.S. Application Data

(63) Continuation-in-part of application No. 09/375,939, filed on Aug. 17, 1999, now Pat. No. 6,228,126.

(51) Int. Cl.⁷ .............................................. D21H 13/02

(52) U.S. Cl. ............................ 162/157.6; 162/9; 8/181; 8/189

(58) Field of Search ...................... 162/9, 157.1, 157.6; 8/108.1, 107, 116.1, 181, 189

(56) References Cited

U.S. PATENT DOCUMENTS

| | | | | |
|---|---|---|---|---|
| 3,124,503 A | * | 3/1964 | Zachariasen ................... | 162/9 |
| 3,133,856 A | * | 5/1964 | Neely ....................... | 162/157.6 |
| 3,434,918 A | | 3/1969 | Bernardin | |
| 3,440,135 A | | 4/1969 | Chung | |
| 3,455,778 A | | 7/1969 | Bernardin | |
| 4,124,439 A | | 11/1978 | Dessauer et al. ........... | 162/146 |
| 4,731,162 A | | 3/1988 | Solarek et al. .............. | 162/175 |
| 4,780,339 A | | 10/1988 | Lacourse et al. ......... | 427/389.7 |
| 4,966,652 A | | 10/1990 | Wasser ...................... | 162/135 |
| 5,334,756 A | | 8/1994 | Likibi et al. ................. | 562/565 |
| 5,504,246 A | | 4/1996 | Libiki et al. ................. | 562/540 |
| 5,698,688 A | | 12/1997 | Smith et al. ................... | 536/56 |
| 5,906,894 A | | 5/1999 | West et al. .................. | 428/507 |
| 6,087,135 A | | 7/2000 | Kierulff ....................... | 435/101 |
| 6,228,126 B1 | | 5/2001 | Cimecioglu et al. ......... | 8/108.1 |
| 6,254,724 B1 | * | 7/2001 | Seltzer et al. ................. | 162/70 |
| 6,319,361 B1 | * | 11/2001 | Smith et al. ................. | 162/146 |
| 6,331,619 B1 | | 12/2001 | Besemer et al. ............ | 536/105 |
| 6,368,456 B1 | | 4/2002 | Cimecioglu et al. ........ | 162/146 |
| 6,379,494 B1 | | 4/2002 | Jewell et al. ................... | 162/9 |
| 6,409,881 B1 | * | 6/2002 | Jaschinski ...................... | 162/9 |
| 2001/0034442 A1 | | 10/2001 | Bragd et al. ................ | 536/102 |
| 2002/0005262 A1 | | 1/2002 | Cimecioglu et al. ........... | 162/9 |
| 2002/0098317 A1 | * | 7/2002 | Jaschinski et al. ............. | 428/72 |

FOREIGN PATENT DOCUMENTS

| | | | | |
|---|---|---|---|---|
| CA | 1291303 | 10/1991 | ....................... | 9/52 |
| DE | 1256528 | 12/1967 | | |
| DE | 2113216 | 10/1972 | | |
| DE | 2332294 | 1/1975 | | |
| DE | 19746805 C1 | 4/1999 | ........... | C08B/31/18 |
| DE | 19953590 A1 | * 5/2001 | ........... | D21H/11/20 |
| EP | 440472 | 8/1995 | | |
| GB | 1396891 | 6/1975 | | |
| GB | 1471226 | 4/1977 | | |
| JP | 4237586 | 3/1994 | ........... | D21H/19/20 |
| WO | WO 95/07303 | 3/1995 | ........... | C08B/37/00 |
| WO | WO 96/38484 | 12/1996 | ........... | C08B/31/18 |
| WO | WO 99/23117 | 5/1999 | ........... | C08B/15/04 |
| WO | WO 99/23240 | 5/1999 | ........... | C12P/19/04 |
| WO | WO 00/50388 | 8/2000 | ......... | C07C/239/08 |
| WO | WO 00/50462 | 8/2000 | ........... | C08B/15/02 |
| WO | WO 00/50463 | 8/2000 | ........... | C08B/15/02 |
| WO | WO 00/50621 | 8/2000 | ............. | C12P/1/00 |
| WO | WO 200134656 A1 | * 5/2001 | ........... | C08B/15/02 |

OTHER PUBLICATIONS

J. Bobbitt et al., "Organic Nitrosonium Salts as Oxidants in Organic Chemistry", *Heterocycles*, vol. 27, No. 2, 1988, pp. 509–533.

A. de Nooy et al., "Selective Oxidation of Primary Alcohols Mediated by Nitroxyl Radical in Aqueous solution. Kinetics and Mechanism", *Tetrahedron*, vol. 51, No. 29, 1995, pp. 8023–8032.

P. Chang et al., "Oxidation of Primary Alcohol Groups of Naturally Occurring Polysaccharides with 2,2,6, 6–Tetramethyl–1–Piperiding Oxoammonium Ion", *J. Carbohydrate Chemistry*, 15(7), 1996, pp. 819–830.

Takuya, Kitaoka, Akira Isogai, Fumihiko Onabe, *Nordic Pulp and Paper Research Journal* vol. 14 no, Apr. 1999 "Chemical Modification of Pump Fibers by TEMPO–Mediated Oxidation".

G.A. Petropavlovskii, et al., "Solid–Phase Reactions of Cellulose with Occluded Glyoxal", *Cellulose Chem. Technol.*, vol. 14, No. 5, 1980, pp. 683–696.

R.C. Weatherwax, et al., "Pore Structure of Papers Wet Stiffened by Formaldehyde Crosslinking", *J. Colloid Interface Sci.*, vol. 67, No. 3, 1978, pp. 498–515.

E.I. Larina, et al., "Crosslinking Cellulose in Fibrous Sheet Materials with Dimethylol Ethylene Urea and Dimethylol Urea", *Khim. Drev.*, No. 3, 1978, pp. 87–94.

P.G. Sekachev, "Applications of Glyoxal in the Paper Industry", *Sb. Tr. Tsentr. Nauch.–Issled. Inst. Bumagi*, No. 9, 1974, pp. 257–260.

L.A. Olsson, "Improving the Moisture Resistance of Paper", *FEFCO*, Bull. No. 87, 1974, pp. 11–14, 27–31, 47–49, 63–65, 67.

(List continued on next page.)

Primary Examiner—José A. Fortuna
(74) Attorney, Agent, or Firm—David P. LeCroy, Esq.

(57) ABSTRACT

Paper comprising aldehyde modified cellulose pulp having selected aldehyde content. Another embodiment involves a method of preparing celullose aldehydes using selective oxidation with a limited amount of oxidant and a nitroxyl radical mediator and defined reaction conditions to provide oxidized cellulose material with effective aldehyde content making it particularly suitable for use in making paper with desirable wet strength, temporary wet strength and dry strength properties, including compressive strength and resistance.

11 Claims, No Drawings

OTHER PUBLICATIONS

A.J. Morak, et al., "Cross–Linking of Linerboard to Reduce Stiffness Loss IV. Application of Blocked Diisocyanates", *Tappi*, vol. 53, No. 12, 1970, pp. 2278–2283.

J.S. Upadhyaya, et al., "Possible Chemical Modifications in Papermaking Fibers for Improved Properties", *Indian Pulp Pap.*, vol. 36, No. 2, 1981, pp. 3–8.

D.F. Caulfield, et al., "Soform Paper: Vapour Phase Crosslinked Paper for Uses Requiring High Wet Stiffness", *Int. Paper Physics Conf.*, Sep., 1975, pp. 51–61.

P.E. Trout, "Improvement of Paperboard Stiffness by Graft Polymerization and Chemical Crosslinking", *Tappi*, vol. 50, No. 7, 1967, pp. 89–94A.

D.F. Caulfield, et al., "Tensile Modulus of Paper Wet–Stiffined by Crosslinking", *Tappi (Annu. Meet Prepr. for Meet*, Chicago, Ill, Mar. 6–8), 1978, pp. 59–67.

M. Laleg, "Minerals in Papermaking—Scientific and Technological Advances in Fillers", *Pira International Conference Proceedings*, Stokholm Sweden (Feb. 9–10), 1999, 20 pgs.

K. Ward, Jr., "Crosslinking of Linerboard to Reduce Stiffness Loss", *Tappi*, vol. 51, No. 11, 1968, pp. 138–141A.

R.C. Weatherwax, et al., "Cross–Link Wet–Stiffining of Paper—Cross–Linking in a Dehydrating Environment", *Tappi* 59, No. 8, 1976, pp. 85–87.

G. Xu, et al., "Comparison of the Kraft Paper Crosslinked by Polymeric Carboxylic Acids of Large and Small Molecular Sizes: Dry and Wet Performance", *J. Appl. Polym. Sci.*, vol. 74, No. 4, 1999, pp. 907–912.

Y. Xu, et al., "Wet Reinforcement of Paper with High Molecular Meight Multifunctional Carboxylic Acid", *Tappi J.*, vol. 82, No. 8, 1999, pp. 150–156.

Y. Xu., "Wet Strength Improvement of Paper Via Ester Crosslinking Using Polymeric Multifunctional Carboxylic Acids", *UMI Dissertation Service*, University of Georgia, 1997, 114 pgs.

D.F. Caufield, "Ester Crosslinking to Improve Wet Performance of Paper Using Multifunctional Carboxyilic Acids, Butanetetracarboxylic and Citric Acid", *Tappi J.*, vol. 77, No. 3, 1994, pp 205–212.

C.Q. Yang, et al., Paper Wet Performance and Ester Crosslinking of Wood Pulp Cellulose by Poly (Carboxylic Acid)s, *J. Appl. Polym. Sci.*, vol. 67. No. 4, 1998, pp. 649–658.

Luner, Philip, et al. "The Effect of Chemical Modification on The Mechanical Properties of Paper", Tappi, Jan. 1967, vol. 50, No. 1.

* cited by examiner

ALDEHYDE MODIFIED CELLULOSE PULP FOR THE PREPARATION OF HIGH STRENGTH PAPER PRODUCTS

This application is a continuation in part of application Ser. No. 09/375,939 filed Aug. 17, 1999 now U.S. Pat. No. 6,228,126.

BACKGROUND OF THE INVENTION

This invention relates to paper comprising aldehyde modified cellulose pulp or fiber and further to the method of preparing aldehyde modified cellulose and cellulose pulp or fiber using selected oxidation conditions to generate aldehyde functionality. More particularly, this invention involves paper made from cellulose pulp having a defined amount of aldehyde content. A method for preparing the selected aldehyde modified cellulose and cellulose pulp involves using a nitroxyl radical mediated oxidation with a limited amount of oxidant and defined reaction conditions. This aldehyde modified pulp is used in the production of tissue/towel and other paper products which exhibit unexpected high wet strength, temporary wet strength and dry strength properties, including compression strength and resistance, and high wet strength/dry strength ratios without the use of other additives.

The term "paper" as used herein, includes sheet-like masses and molded products made from pulp or fibrous cellulosic material which may be derived from natural sources. Paper may also be made from synthetic cellulosic fibers and regenerated cellulose as well as recycled waste paper. In addition, paper made from combinations of cellulosic and synthetic materials are applicable herein. Paperboard is included within the broad term "paper".

Papermaking, as it is conventionally known, is a process of introducing an aqueous slurry of pulp or wood cellulosic fibers (which have been beaten or refined to achieve a level of fiber hydration and to which a variety of functional additives can be added) onto a screen or similar device in such a manner that water is removed, thereby forming a sheet of the consolidated fibers, which upon pressing and drying can be processed into dry roll or sheet form. Typically in papermaking, the feed or inlet to a papermaking machine is an aqueous slurry or water suspension of pulp fibers which is provided from what is called the "wet end" system. In the wet end, the pulp along with other additives are mixed in an aqueous slurry and subject to mechanical and other operations such as beating and refining. Various additives are commonly added to help provide different properties in the paper product.

The preparation of aldehyde containing starches and the use of such aldehyde derivatives in the paper industry as wet and dry strength additives is well known. Both oxidative and non-oxidative methods are known for introducing aldehyde groups into starch. Use of these products in papermaking to provide wet and dry strength properties involves the addition of this separate starch additive component.

The use of nitroxyl radicals and nitrosonium salts in organic chemistry as an oxidative route to produce aldehydes and carboxylic acids from primary and secondary alcohols is disclosed in an article entitled "Organic Nitrosonium Salts As Oxidants in Organic Chemistry" by J. M. Bobbitt and C. L. Flores, in *Heterocycles*, Vol. 27, No. 2, 1988, pp. 509–533. Recently, application of this chemistry was extended to the selective oxidation of primary alcohols in various carbohydrates to carboxylic acids in an article entitled "Selective Oxidation of Primary Alcohols Mediated by Nitroxyl Radical in Aqueous Solution. Kinetics and Mechanism" by A. E. J. de Nooy and A. C. Bessemer, in *Tetrahedron*, Vol. 51, No. 29, 1995, pp. 8023–8032. Patent publication WO 95/07303 dated Mar. 16, 1995 further discloses the use of this technology where carbohydrates having a primary hydroxyl group are oxidized under aqueous conditions to form products having a high content of greater than 90% carboxyl groups. This art involving the oxidation of primary alcohols generally describes the preparation of polyglucuronic acids with high carboxylic acid content. Similarly, the process of oxidation has been used to prepare various polysaccharides with high carboxyl content as described in "Oxidation of Primary Alcohol Groups of Naturally Occurring Polysaccharides with 2,2,6,6-Tetramethyl-1-piperidine Oxoammonium Ion" by P. S. Chang and J. F. Robyt in *J. Carbohydrate Chemistry*, 15(7), 1996, pp. 819–830. It should be noted that in some applications high carboxylic acid content is undesirable.

Recent patent publications WO 99/23240 and 99/23117, both dated May 14, 1999, respectively discose methods of oxidizing starch and cellulose using an oxoammonium ion producing reagent in the presence of an enzyme oxidizing agent.

Despite the various methods described above, there still is the need for cellulose pulp which is suitable for use in paper applications to provide the desired high degree of wet strength, temporary wet strength and dry strength properties, and improved compression strength and resistance, and does not involve the use of separate additive components.

SUMMARY OF THE INVENTION

This invention is directed to paper having wet strength, temporary wet strength and dry strength properties, including improved compression strength and resistance, and comprising aldehyde modified cellulose pulp wherein the pulp has from 1 to 20 mmoles of aldehyde per 100 g of cellulose.

Another embodiment of this invention involves the selective preparation of cellulose aldehyde and cellulose pulp aldehyde under defined oxidation conditions using a nitroxyl radical mediated aqueous oxidation procedure to provide derivatives with effective aldehyde content particularly useful in papermaking. More particularly, this invention involves the oxidation of cellulose or cellulose pulp in an aqueous solution with an oxidant having an equivalent oxidizing power of up to 5.0 g of active chlorine per 100 g of cellulose and an effective mediating amount of nitroxyl radical, the reaction being carried out at a pH of about 8.0 to 10.5, and a temperature of from about 5 to 50° C., the resulting product having an aldehyde content of about 1 to 20 mmole/100 g of pulp.

This invention further involves aldehyde modified cellulose or cellulose pulp having defined aldehyde content.

Still another embodiment involves the method of preparing paper having wet strength, temporary wet strength and dry strength properties, including compression strength and resistance, comprising using the cellulose aldehyde pulp prepared by the selective oxidation procedure as described above, as the paper or pulp stock or a component thereof.

DETAILED DESCRIPTION OF THE INVENTION

The cellulose or cellulose pulp aldehyde derivatives of this invention have effective aldehyde functionality or content of from about 1 to 20 and preferably from about 5 to 20 mmoles/100 g of cellulose material, i.e., cellulose or cellulose pulp.

The cellulose aldehyde derivatives of this invention can be prepared by a method which involves the selective oxidation of cellulose and cellulose pulp or fiber using a limited amount of oxidant mediated with a nitroxyl radical under defined conditions to provide derivatives with effective aldehyde content making them particularly suitable for use in providing paper with desired wet strength, temporary wet strength and dry strength properties, including compression strength and resistance.

The nitroxyl radical mediator used herein is a di-tertiary alkyl nitroxyl radical having one of the following formulas:

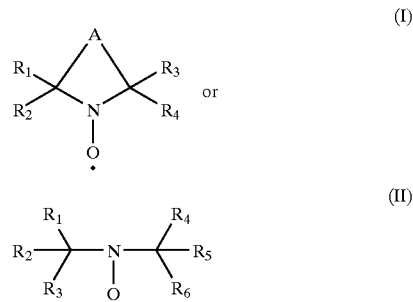

where A represents a chain of preferably two or three atoms, in particular carbon atoms or a combination of one or two carbon atoms with an oxygen or nitrogen atom, and the R groups represent the same or different alkyl groups. Chain A may be substituted by one or more groups such as alkyl, alkoxy, aryl, aryloxy, amino, amido or oxo groups, or by a divalent group or multivalent group which is bound to one or more other groups having formula I. Particularly useful nitroxyl radicals are di-tertiary alkyl nitroxyl radicals having the formula:

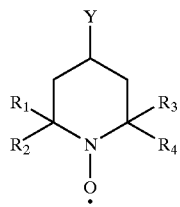

where Y is either H, OH or NH—C(O)—$CH_3$ and each of the R groups represent the same or different alkyl groups of 1 to 18 carbon atom and more particularly methyl groups. Nitroxyl radicals of this type include those where a) the R groups are all methyl (or alkyl of 1 carbon atom) and Y is H, i.e., 2,2,6,6-tetramethyl-1-piperdinyloxy (TEMPO); b) R groups are methyl and Y is OH and identified as 4-hydroxy TEMPO; and c) R groups are methyl and Y is NH—C(O)—$CH_3$ and identified as 4-acetarido-TEMPO. The preferred nitroxyl radical is TEMPO or 4-acetamido-TEMPO. The nitroxyl radical is used in an effective amount to mediate the oxidation and more particularly from about 0.001 to 20% by weight, preferably from about 0.01 to 0.1% by weight, based on the weight of cellulose, cellulose pulp or fiber. The nitroxyl radical can be added to the reaction mixture or generated in situ from the corresponding hydroxylamine or oxoammonium ion.

The oxidant used in this invention can be any material capable of converting nitroxyl radicals to their corresponding oxoammonium salt. Particularly useful oxidants are the alkali or alkaline-earth metal hypohalite salts such as sodium hypochlorite, lithium hypochlorite, potassium hypochlorite or calcium hypochlorite. An alkali or alkaline earth-metal hypobromite salt may also be used and it may be added in the form of the hypobromite salt itself, such as sodium hypobromite, or it may be formed in situ from the addition of a suitable oxidant such as sodium hypochlorite and an alkali or alkaline-earth metal bromide salt such as sodium bromide. The bromide ion is generally in the form of sodium bromide. Additional oxidants that can be used in this method include hydrogen peroxide in combination with a transition metal catalyst such as methyltrioxorhenium (VII); hydrogen peroxide in combination with an enzyme; oxygen in combination with a transition metal catalyst; oxygen in combination with an enzyme; peroxyacids such as peracetic acid and 3-chloroperoxybenzoic acid; alkali or alkaline-earth metal salts of persulfates such as potassium persulfate and sodium persulfate; alkali or alkaline-earth metal salts of peroxymonosuffates such as potassium peroxymonosulfate; chloramines such as 1,3,5-trichloro-1,3,5-triazine-2,4,6(1H, 3H,5H)trione, 1,3-dichloro-1,3,5-triazine-2,4,6(1H,3H,5H) triione sodium salt, 1,3-dichloro-5,5-dimethylhydrantoin, 1-bromo-3-chloro-5,5-dimethylhydrantoin, and 1-chloro-2, 5-pyrrolidinedione; and alkali or alkaline-earth metal salts of ferricyanide. This list of oxidants is only illustrative and is not intended to be exhaustive. The oxidants can be used alone or in combination with an alkali or alkaline-arth metal bromide salt. The preferred oxidant is sodium hypochlorite or sodium hypobromite formed from the addition of sodium hypochlorite and sodium bromide.

The important factor in the use of the oxidant is that it must be used in a limited amount that has the equivalent oxidizing power of up to 5.0 g of active chlorine per 100 g of cellulose or cellulose pulp. More particularly, the amount of oxidant used will have an equivalent oxidizing power of from about 0.05 to 5.0 g of active chlorine and preferably from about 0.5 to 2.5 g of active chlorine per 100 g of cellulose or cellulose pulp. When sodium hypochlodte is used, it is used in a limited amount of up to about 10 percent by weight based on the weight of cellulose or cellulose pulp, more particularly from about 0.1 to 10% and preferably from about 1 to 5% by weight based on the weight of cellulose or cellulose pulp. Bromide in the form of sodium bromide will generally be used in an amount of from about 0.1 to 5% by weight and preferably from about 0.25 to 2% by weight based on the weight of cellulose or cellulose pulp. By limiting the amount of oxidant under defined aqueous conditions, the cellulose aldehyde derivatives are selectively prepared at effective high aldehyde levels. Such high aldehyde cellulose products are particularly useful in preparing paper with wet strength, temporary wet strength and dry strength properties, including compression strength and resistance.

The cellulose material used as the starting material may be any cellulose, cellulosic fiber or pulp material. This includes hardwood or softwood cellulosic fibers such as bleached and unbleached sulfate (Kraft), bleached and unbleached sulfite, bleached and unbleached soda, neutral sulfite, semi-chemical, groundwood, chemi-groundwood, and any combination of these fibers. In addition, synthetic cellulosic fibers of the viscose rayon or regenerated cellulose type can also be used, as well as recycled waste papers from various sources. The consistency in water of the cellulose or pulp that is used will be from about 0.1 to 15% by weight solids in water and preferably from about 1 to 5% by weight. When used in papenmaking other additives such as desired inert fillers or retention aids may be added to the cellulose pulp. Such materials include clay, titanium dioxide, talc, calcium carbonate, calcium sulfate and diatomaceous earth. Rosin or synthetic internal size may also be present, if desired. Other additives commonly used in paper may also be used in combination with the oxidized pulp of this invention.

The oxidation reaction of the cellulosic material is carried out in an aqueous solution. The pH of the reaction is maintained at about 8.0 to 10.5, preferably about 9 to 10, the temperature is maintained at from about 5 to 50° C., preferably from about 20 to 30° C. The extent of the reaction is controlled by the amount of oxidant used or the reaction time. Generally the reaction time will be from about 5 to 60 minutes, and more particularly from about 20 to 30 minutes.

By using the reagent and component amounts as defined previously and the noted reaction conditions, controlled amounts of aldehyde functionality, particularly C-6 aldehyde, can be obtained that are suitable and effective in providing desired wet strength, temporary wet strength, and dry strength properties, including compression strength and resistance, and wet strength/dry strength ratios desired in the final prepared paper product. The cellulose aldehyde derivatives prepared in accordance with this invention will have effective aldehyde functionality of from about 1 to 20 and preferably from about 5 to 20 mmole/100 g of cellulosic material i.e., cellulose or cellulose pulp. Carboxylic acid functionality will also be generated or formed during the oxidation process. Amounts of carboxyl content generated will generally be from about 1 to 40 mmole/100 g of cellulose or cellulose pulp, particularly from about 1 to 20 and more particularly from about 1 to 10 mmole/100 g cellulose or cellulose pulp. It should be noted that this amount of carboxylic acid functionality is in addition to what may already be present in the cellulose or cellulose pulp naturally or by virtue of the type of processed pulp used, such as bleached sulfate, bleached sulfite, etc. The effective level of aldehyde is an important aspect of this invention and one way this can be defined is by the ratio of aldehyde to generated carboxylic acid functionalities. Such levels can be defined by aldehyde to generated carboxylic acid ratios of greater than or equal to 0.5 (based on mmole/100 g of cellulose or cellulose pulp of each functionality) and preferably greater than or equal to 1.0. While recognizing that the amount of additional carboxylic functionality (i.e., other than generated) will vary and may be fairly low, there nevertheless will be some present and this will affect the level of total carboxylic acid functionality. Considering this and based on total carboxylic acid, the ratio of aldehyde to carboxylic acid functionality will be from about 0.2 or more. The significance of this aldehyde content is particularly manifested in the resulting properties found in paper prepared from the oxidized cellulose material. High wet strength, temporary wet strength and dry strength properties, including compression strength and resistance, are found. Products having high wet strength/dry strength ratios of greater than 20% have been obtained in paper using these selectively modified cellulose aldehyde derivatives indicating improved properties such as softness.

Compression strength and resistance are components of the dry strength of paper, and are particularly significant in paperboard quality. Compression strength relates to the edgewise compression strength of paper and is commonly measured by the Swedish Forest Products Laboratory (STFI) short-span test. Compression resistance is a measure of the elastic and inelastic buckling or edge crush resistance of the paper and is commonly measured by the Ring Crush test. The Ring Crush and STFI tests are described in detail in the Handbook of Physical & Mechanical Testing of Pulp & Paperboard, Johnson, J. A., Bennett, K. A. et al, Marcel Decker, N.Y., (1983) pages 181–190, which is incorporated herein by reference. The modified papers of the present invention demonstrate improved compression properties as expressed by their STFI and Ring Crush tests of greater than about one percent, and preferably greater than about five percent, over papers made from a corresponding unmodified pulp.

Further, the moisture absorption by papers which is caused by high humidity conditions is known to significantly reduce the compression strength of papers. The papers of the present invention demonstrate improved compression strength and resistance even in environments of relatively high temperature and humidity. This increase in compression strength is greater than about 1%, preferably greater than about 5% over the compression strength of papers made from a corresponding unmodified pulp.

It is noted that use of the modified aldehyde cellulose derivatives of this invention in papermaking may involve the use of such derivatives as the whole or entire pulp or paper stock or it may be used as a component of the paper stock (i.e., in amounts of 20, 40, 60% by weight etc.).

The following examples will more fully illustrate the embodiments of this invention. In the examples, all parts and percentages are by weight and all temperatures in degrees Celsius unless otherwise noted. Also, when referring to the pulp by weight, it is the weight of the pulp per se, i.e., it includes equilibrium moisture content.

EXAMPLE 1

Modification of Northern Softwood Kraft (NSK) Pulp

To a 1600 g stirred suspension of NSK pulp at 3% consistency (48 g pulp) was added 4.8 mg 4-acetamido-TEMPO and 0.24 g sodium bromide [0.01% and 0.5% on weight of pulp (owp) respectively]. The pH of the mixture was adjusted to 9.5 with 0.49 N sodium hydroxide. Sodium hypochlorite (10.11 g; 9.5% solution; 2% owp), whose pH was also adjusted to 9.5 using concentrated HCl, was then added all at once and the mixture was stirred at 25° C. for 30 minutes. The pH of the suspension was maintained throughout using a Brinkmann pH STAT 718 Titrino at 9.5 with 0.49 N NaOH (7.9 mL). At the end of the treatment period, the reaction was terminated by adding ascorbic acid to the mixture until its pH was lowered to 4.0 to 4.5 range (ca. 1 g).

The pulp was filtered and washed extensively with water whose pH was adjusted to 4.5 to 5.5. It was then either re-slurried in water for subsequent use in handsheet making or dried in air at room temperature for future use.

EXAMPLE 2

The procedure described in Example 1 was repeated with the exception that it was carried out based on 248 g pulp and the 4-acetamido-TEMPO was omitted from the treatment. This control treatment consumed 1.22 mL of 0.98 N NaOH during maintenance of pH of the mixture at 9.5 during the 30 minute treatment.

EXAMPLE 3

Modification of Hardwood Pulp

To a 1600 g stirred suspension of hardwood pulp at 3% consistency (48 g pulp) was added 4.8 mg 4-acetamido-TEMPO and 0.24 g sodium bromide. The pH of the mixture was adjusted to 9.5 with 0.49 N sodium hydroxide. Sodium hypochlorite (10.11 g; 9.5% solution; 2% owp), whose pH was also adjusted to 9.5 using concentrated HCl, was then added all at once and the mixture was stirred at 25° C. for 30 minutes. The pH of the suspension was maintained throughout using a Brinkmann pH STAT 718 Titrino at 9.5 with 0.49 NaOH, consuming 4.8 mL. At the end of the treatment period, the reaction was terminated by adding ascorbic acid to the mixture until its pH was lowered to 4.0 to 4.5 range (ca. 1 g). The pulp was filtered and washed extensively with water whose pH was adjusted to 4.5 to 5.5. It was then either re-slurried in water for subsequent use in handsheet-making or air-dried at room temperature for future use.

EXAMPLE 4

The procedure described in Example 3 was repeated with the exception that it was carried out based on 248 g pulp and the 4-acetamido-TEMPO was omitted from the treatment. This control treatment consumed 1.96 mL of 0.98 N NaOH during maintenance of pH of the mixture at 9.5 during the 30 minute treatment time.

EXAMPLE 5

Determination of Aldehyde Content on Modified Pulps

Aldehyde content of modified pulps were determined using hydroxylamine hydrochloride titration via oxime derivatization to the following reaction and the procedure.

$$RCHO + NH_2OH \cdot HCl \rightarrow RCHNOH + HCl$$

An oxidized pulp suspension in water 1200 g at 3% consistency was pH adjusted to 4 with aqueous HCl. To this mixture was added dropwise a large excess of an aqueous solution of 2 M hydroxylamine hydrochloride solution (ca. 15 mL), whose pH was also adjusted to 4 with HCl. During the reaction, the pH of the mixture was maintained at 4 via titration with a 0.49 N NaOH solution using a Brinkmann pH STAT 718 Titrino. The titration was continued until no further reduction in pH of the mixture could be detected (ca. 1 h). Aldehyde levels are then calculated based on the total consumption of NaOH using the following equation:

$$\text{mmole}/100\ g\text{-}CHO = \frac{\text{mL of NaOH titrant} \times N \text{ of NaOH}}{\text{pulp weight in g}} \times 100$$

Table 1 lists the —CHO content of pulp samples prepared in Examples 1 to 4.

Carboxylic Acid Content of Modified Pulps

The level of carboxylic acid formed during these treatments was calculated from the amount of NaOH titrant consumed to maintain the pH of the reactions. This provides a direct measure of the additional carboxylic acid generated on the pulp and was calculated using the following equation:

$$\text{mmole}/100\ g\ \text{—COOH} = \text{mL of NaOH titrant} \times N \text{ of NaOH} \times 100$$

pulp weight in g

Table 1 lists the —COOH content of modified pulp samples prepared in Examples 1 to 4.

TABLE 1

Aldehyde and carboxylic acid moieties generated in pulp treatments described in Examples 1 to 4.

| Pulp Prepared in EXAMPLE # | Aldehyde Content (mmole/100 g) | Carboxylic Acid Generated (mmole/100 g) |
|---|---|---|
| 1 | 8.7 | 8.1 |
| 2 | <0.5 | 0.5 |
| 3 | 10.1 | 4.9 |
| 4 | <0.5 | 0.8 |

EXAMPLE 6

Following their modification by the oxidative process described in the prior examples, modified pulp samples (600 to 650 CSF) were formed into 18 lb/3300 sq.ft handsheets from 0.3% consistency and at pH 5 to 6 on an M/K Sheet Former. Test strips (1" wide) were cut from handsheets and tested for initial wet strength and dry tensile strength at the breaking point according to the TAPPI Standard Test Method T 456. Table 2 lists the tensile strength performance data from handsheets of surface modified pulp samples prepared in Examples 1 to 4.

TABLE 2

Wet and dry tensile strength performance of handsheets prepared from pulps modified as described in Examples 1 to 4.

| Pulp Used | Wet Tensile Strength (g/in) | Dry Tensile Strength (g/in) | Wet/Dry Ratio (Wet st./Dry st. ×100) |
|---|---|---|---|
| Untreated NSK | 19 | 2028 | 1 |
| Example 1 | 614 | 2504 | 25 |
| Example 2 | 38 | 2018 | 2 |
| Untreated Hardwood | 19 | 1243 | 2 |
| Example 3 | 278 | 1399 | 20 |
| Example 4 | 16 | 949 | 2 |

EXAMPLE 7

Modification of 70/30 Blend of Softwood/Hardwood Pulps

To an 800 g stirred pulp suspension of 1.3% consistency in water comprising of a 70/30 (wtw) mixture of softwood/hardwood (10.4 g total pulp) was added 10.4 mg 4-acetamido-TEMPO and 0.31 g sodium bromide (0.1% and 3% on weight of pulp respectively). The pH of the mixture was adjusted to 9.5 with 0.98 N sodium hydroxide. Sodium hypochlorite (9.81 g of 10.6% solution; 10% owp as hypochlorite), whose pH was also adjusted to 9.5 using concentrated HCl, was then added all at once and the mixture was stirred at 25° C. for 10 minutes. The pH of the suspension was maintained throughout using a Brinkmann pH STAT 718 Titrino at 9.5 with 0.98 N NaOH (0.57 mL). At the end of the treatment period, the reaction was terminated by by adding ascorbic acid to the mixture until its pH was lowered to 4.0 to 4.5 range (ca. 2 g).

The pulp was recovered as described in Example 1. Handsheets made from this pulp exhibited 301 g/in and 1355 g/in wet and dry tensile strengths respectively.

EXAMPLE 8

Softwood pulp was modified under the conditions described in Example 7. The pulp was filtered-off and washed extensively with water whose pH was adjusted to 4.5 to 5.5. It was then re-slurried in water at neutral pH. Portions of this pulp suspension were then mixed with unoxidized hardwood pulp suspensions in order to determine the effect of increasing modified softwood fraction in untreated hardwood. Handsheets were made from these pulp mixtures and tested as described in Example 6. Table 3 lists the tensile strength results of handsheets made from these pulp compositions.

TABLE 3

The effect of blending oxidized softwood pulp with an unmodified hardwood pulp on the wet and dry tensile strength of handsheets prepared from such pulp compositions.

| Pulp Composition Modified Softwood/ Unmodified Hardwood (w/w) | Wet Tensile Strength (g/in) | Dry Tensile Strength (g/in) | Wet/Dry Ratio (%) |
| --- | --- | --- | --- |
| 0/100 | 20 | 1012 | 2 |
| 10/90 | 39 | 1231 | 3 |
| 20/80 | 15 | 1291 | 6 |
| 30/70 | 125 | 1490 | 8 |
| 40/60 | 183 | 1722 | 11 |
| 50/50 | 232 | 1714 | 14 |
| 100/0 | 557 | 2243 | 25 |

EXAMPLE 9

The process described in Example 1 was repeated under similar conditions on NSK pulp in order to determine the effect of process variables on aldehyde generation and paper strength properties. Therefore, 4.8 mg 4-acetamido-TEMPO and 0.24 g sodium bromide were added to stirred pulp suspensions in water of 1600 g slurry at 3% consistency (48 g pulp). pH of the mixtures were adjusted to required level with 0.49 N NaOH. Sodium hypochlorite (7.68 g as 12.5% solution at desired pH) was then added all at once and the mixtures were stirred for a prescribed period at a given temperature. The pH of the mixtures were maintained throughout using a Brinkmann STAT 718 Titrino with 0.49 N NaOH. At the end of the treatment period, the reactions were terminated by adding ascorbic acid to the mixture until its pH was lowered to 4.0 to 4.5 range (ca. 1 g).

The pulps were filtered and washed extensively with pH adjusted water (4.5 to 5.5). They were then re-slurried in water and tested for aldehyde content and handsheet wet tensile strength and dry strength performance as described in Examples 5 and 6 respectively. Table 4 lists the testing results.

EXAMPLE 10

The process described in Example 1 was repeated under similar conditions on NSK pulp in order to determine the effect of process variables of pulp consistency, 4-acetamido-TEMPO, sodium bromide and sodium hypochlorite concentrations on the wet and dry strength and wet/dry ratio of the handsheets prepared from modified pulps. Therefore, appropriate quantities of 4-acetamido-TEMPO and sodium bromide were added to stirred pulp suspensions in water of either 800 g at 1.3% consistency or 1600 g slurry at 3% consistency (10.4 g or 48 g pulp respectively). pH of the mixtures were adjusted to 9.5 with 0.49 N sodium hydroxide. Required amounts of sodium hypochlorite (as 10 to 13% solutions at pH 9.5) were then added all at once and the mixtures were stirred at 25° C. for 30 minutes. The pH of the mixtures were maintained throughout using a Brinkmann pH STAT 718 Titino at 9.5 with 0.49 N NaOH. At the end of the treatment period, the reactions were terminated by adding ascorbic acid to the mixture until its pH was lowered to 4.0 to 4.5 range (ca. 1 g).

The pulps were filtered and washed extensively with pH adjusted water (4.5 to 5.5). They were then re-slurried in water and formed into handsheets and tested as described in Example 6.

Table 5 lists the handsheet testing results obtained from NKS pulp treated with different reagent concentrations

TABLE 5

The effect of reagent concentrations during NSK oxidation on strength properties of handsheets made from resulting pulp

| Oxidation Conditions | | | | Paper properties | | |
| --- | --- | --- | --- | --- | --- | --- |
| NSK Consistency (%) | 4-acetamido-TEMPO (wt %)* | Sodium bromide (wt %)* | Sodium Hypochlorite (wt %)* | Wet Tensile Strength (g/in) | Dry Tensile Strength (g/in) | Wet/Dry Ratio (%) |
| Untreated NSK pulp | | | | 18 | 2142 | 1 |
| 1.3 | 0.1 | 3.0 | 10.0 | 552 | 2282 | 24 |
| 1.3 | 0.02 | 2.0 | 2.5 | 550 | 2253 | 24 |
| 1.3 | 0.02 | 1.0 | 2.5 | 395 | 2230 | 18 |
| 1.3 | 0.02 | 0 | 2.5 | 197 | 2108 | 9 |
| 3.0 | 0.02 | 2.0 | 2.5 | 743 | 2518 | 30 |
| 3.0 | 0.01 | 0.5 | 2.0 | 625 | 2456 | 25 |
| 3.0 | 0.005 | 0.5 | 1.5 | 528 | 2383 | 22 |

*All reagent quantities given are based on weight of pulp.

TABLE 4

The effect of process variables during NSK treatment on the properties of the modified pulp and handsheets.

| Oxidation Conditions | | | Pulp Properties | | | Paper Properties | | |
| --- | --- | --- | --- | --- | --- | --- | --- | --- |
| | | | —CHO Content | —COOH Generated | —CHO/ —COOH Ratio | Wet Tensile | Dry Tensile | Wet/Dry Ratio |
| pH | T (° C.) | Time (min.) | (mmole/ 100 g) | (mmol/ 100 g) | | Strength (g/in) | Strength (g/in) | (%) |
| Untreated NSK Pulp | | | | | | 18 | 2142 | 1 |
| 9.5 | 25 | 30 | 8.7 | 8.1 | 1.1 | 614 | 2504 | 25 |
| 11.0 | 25 | 30 | 1.5 | 4.0 | 0.4 | 240 | 2237 | 11 |
| 8.0 | 25 | 30 | 5.9 | 4.2 | 1.4 | 479 | 2258 | 21 |
| 9.5 | 50 | 30 | 4.3 | 11.5 | 0.4 | 246 | 2230 | 11 |
| 9.5 | 25 | 60 | 7.3 | 9.8 | 0.8 | 578 | 2430 | 24 |

EXAMPLE 11

Three sets of handsheets prepared in Example 10 were also tested for their temporary wet strength characteristics in the following manner. Following the testing of the initial wet strengths, involving a soaking time of approximately 5 seconds in neutral pH water, strips from the corresponding handsheets were tested for their residual wet tensile strength after a soaking time of 30 minutes under similar conditions. This allows the determination percent of "decay" in wet strength, expressed as the percent loss of the average initial wet strength. Results from these samples are given in Table 6.

TABLE 6

The wet tensile strength of handsheets made from oxidized NSK pulps after prolonged soaking (initial wet strengths are from Example 10 and Table 5).

| Initial Wet Tensile Strength (g/in) | Wet Tensile Strength After 30 min. Soaking Time (g/in) | Wet Strength Decay (%) |
|---|---|---|
| 743 | 111 | 85 |
| 625 | 81 | 87 |
| 550 | 63 | 89 |

EXAMPLE 12

The process described in Example 1 was repeated under similar conditions on NSK pulp in order to determine the effect of oxidation pH on the wet and dry strength and wet/dry ratio of the handsheets. Therefore, 1600 g stirred mixtures of 3% consistency NSK pulp in water (48 g pulp) containing 4.8 mg 4-acetamido-TEMPO and 0.24 g sodium bromide were treated with 7.56 g sodium hypochlorite (as 12.7% solution). Mixtures were then stirred at 25° C. for 30 minutes at different pH's which was maintained throughout using a Brinkmann pH STAT 718 Titrino at using 0.49 N NaOH. At the end of the treatment period, the reactions were terminated by adding ascorbic acid to the mixture until its pH was lowered to 4.0 to 4.5 range (ca. 1 g).

The pulps were filtered and washed extensively with pH adjusted water (4.5 to 5.5). They were then re-slurried in water and made into handsheets and tested as described in Example 6. The wet and dry tensile strength of the handsheets made from NSK pulps modified at different pH's are given in Table 7.

TABLE 7

The effect of pH during treatment of NSK pulp on the strength properties of handsheets made from resultant pulps

| | Paper Properties | | |
|---|---|---|---|
| Oxidation pH | Wet Tensile Strength (g/in) | Dry Tensile Strength (g/in) | Wet/Dry Ratio (%) |
| 7.5 | 363 | 2101 | 17 |
| 8.0 | 401 | 1955 | 21 |
| 8.5 | 541 | 2223 | 24 |
| 9.0 | 607 | 2277 | 27 |
| 9.5 | 595 | 2376 | 25 |
| 10.0 | 565 | 2429 | 23 |
| 10.5 | 470 | 2460 | 19 |
| 11.0 | 258 | 2161 | 12 |

The process described in Example 11 was repeated under similar conditions on NSK pulp in order to determine the effect of oxidation time and temperature on the wet and dry strength and wet/dry ratio of the handsheets. Therefore, 1600 g stirred mixtures of 3% consistency NSK pulp in water (48 g pulp) containing 4.8 mg 4-acetamido-TEMPO and 0.24 g sodium bromide were treated with 7.56 g sodium hypochlorite (as 12.7% solution). Mixtures were then stirred at 25° C. for 30 minutes at different 4.8 mg 4-acetamido-TEMPO and 0.24 g sodium bromide were treated with 7.56 g sodium hypgchlorite (as 12.7% at pH 9.5) for different periods of time at different temperatures. The pH was maintained at 9.5 throughout using a Brinkmann pH STAT 718 Titrino at using 0.49 N NaOH. At the end of the treatment period, the reactions were terminated by adding ascorbic acid to the mixture until its pH was lowered to 4.0 to 4.5 range (ca. 1 g). The pulps were filtered and washed extensively with pH adjusted water (4.5 to 5.5). They were then re-slurried in water and made into handsheets and tested as described in Example 6.

The effect on wet and dry tensile strength of handsheets made from NSK pulps modified at different treatment time and temperatures are listed in Table 8.

TABLE 8

The effect on the strength properties of handsheets made from NSK pulps modified at different treatment time and temperatures

| Oxidation Conditions | | Paper Properties | | |
|---|---|---|---|---|
| | | Wet Tensile | Dry Tensile | Wet/Dry |
| Temperature (° C.) | Time (min) | Strength (g/in) | Strength (g/in) | Ratio (%) |
| Untreated NSK Pulp | | 31 | 2170 | 1 |
| 25 | 10 | 562 | 2461 | 23 |
| 25 | 40 | 609 | 2288 | 27 |
| 35 | 10 | 506 | 2166 | 23 |
| 35 | 40 | 469 | 2029 | 23 |

EXAMPLE 14

This example illustrates the improved compression strength and resistance of handsheets prepared from modified pulp compared to the compression strength of handsheets prepared from unmodified pulp.

Bleached softwood kraft (BSWK) pulp, refined to 400–500 CSF (according to TAPPI T 200) was modified as described in Example 1. When determined according to the procedures of Example 5, the modified BSWK pulp had an aldehyde content of 7.8 mmole/100 g pulp. Handsheets were then formed, pressed and dried from both the modified and unmodified BSWK pulps under conditions similar to those described in Example 6 at a 33 lb/1000 ft² basis weight (according to TAPPI T 205).

Recyded old corrugated cardboard (OCC) pulp refined to 500 CSF (TAPPI T 200) was also modified by adding 4-acetamido-TEMPO (12 mg) and sodium bromide (0.72 g) to a suspension (1600 g) of 510 CSF OCC pulp (24 g) at 1.5% consistency and a pH of 9.5. Sodium hypochlorite (22 g, 10.9% solution) adjusted to a pH of 9.5 was added in one portion to the mixture which was stirred at 25° C. for 30 minutes. The pH of the suspension was maintained throughout using a Brinkmann pH STAT 718 Titrino at 9.5 with 0.49 N NaOH (13 mL). The reaction was quenched to a pH of between 4.0 and 4.5 with ascorbic acid (3 g). The modified OCC pulp was determined to have an aldehyde content of 8.3 mmole/100 g by the method of Example 5. Handsheets were then formed, pressed and dried from both the modified and unmodified pulps under the conditions similar to those described in Example 6 at a basis weight of 26 lb/1000 ft² (according to TAPPI T 205).

A mixture of 70% unbleached softwood kraft (UBSWK) and 30% OCC pulps was refined to 500 CSF and modified as described above for the OCC pulp, and the pulp system adjusted to a pH of 5. The modified OCC+UBSWK pulp mixture was determined to have an aldehyde content of 7.8 mmole/100 g by the method of Example 5. Alum at 0.5% by weight of pulp was added to the pulp. Handsheets were then formed, pressed and dried from both the modified and unmodified pulps under conditions similar to those described in Example 6 at a basis weight of 33 lb/1000 ft$^2$ (according to TAPPI T 205).

Table 9 illustrates the compression performance of the handsheets prepared from modified pulps compared to those prepared from unmodified pulps. Ring Crush and STFI was tested according to TAPPI standard procedures T 822 and T 826, respectively. See Tappi Test Methods, 1996–1997 (Tappi Press, Technology Park, Atlanta, Ga. 1996).

TABLE 9

Effect on compression strength properties of handsheets prepared from various modified and unmodified pulps under standard environmental conditions of 25° C. and 50% relative humidity.

|  |  | Ring Crush | | STFI | |
| --- | --- | --- | --- | --- | --- |
| Pulp | modification | KN/m | improvement | KN/m | improvement |
| BSWK | NO | 2.81 | 19.6% | 5.16 | 9.5% |
|  | YES | 3.36 |  | 5.65 |  |
| OCC | NO | 2.36 | 6.8% | 4.67 | 4.3% |
|  | YES | 2.52 |  | 4.87 |  |
| UBSK + OCC | NO | 2.57 | 3.9% | 2.64 | 12.5% |
|  | YES | 2.67 |  | 2.97 |  |

As demonstrated by their improved STFI and Ring Crush values, handsheets prepared from bleached (BWSK) pulp, unbleached (OCC) pulp and mixtures thereof which had been modified, unexpectedly showed significant improvement in both compression resistance and compression strength compared to handsheets prepared from the corresponding unmodified pulps.

EXAMPLE 15

This example illustrates the improvement of the compression strength of the modified papers of the present invention under conditions of high humidity.

Handsheets were prepared from both modified and unmodified 70:30 UBSWK:OCC pulp mixture. The handsheets were conditioned and tested in a high humidity environment at 32° C. and 90% relative humidity. The results are presented in Table 10.

TABLE 10

The compression strength and resistance performance of handsheets prepared from modified and unmodified UBSWK and OCC pulp mixture under high humidity conditions of 32° C. and 90% relative humidity.

|  |  | Ring Crush | | STFI | |
| --- | --- | --- | --- | --- | --- |
| Pulp | modification | KN/m | % improvement | KN/m | % improvement |
| UBSK + OCC | NO | 1.33 | 6% | 1.35 | 3.7% |
|  | YES | 1.41 |  | 1.40 |  |

The results indicate that there is a significant improvement in the compression strength of handsheets prepared from the modified pulp mixtures of the present invention compared to handsheets prepared from the unmodified pulp mixture even under conditions of high humidity.

What is claimed is:

1. Paper having improved wet strength, temporary wet strength and dry strength properties prepared by oxidizing cellulosic pulp material in an aqueous solution in the presence of a nitroxyl radical mediator thereby producing aldehyde-modified cellulose pulp, wherein the aldehyde-modified cellulose pulp has from about 1 to about 20 mmoles of aldehyde per 100 g of cellulose.

2. The paper of claim 1 wherein the aldehyde modified cellulose pulp has from about 5 to about 20 mmole of aldehyde per 100 g of cellulose.

3. The paper of claim 1 having a wet strength to dry strength ratio of at least 20%.

4. The paper of claim 1 wherein the paper has an improved compression strength and resistance of greater than about 1% over that of a paper prepared from a corresponding unmodified cellulose pulp.

5. The paper of claim 4 wherein the paper has an improved compression strength and resistance of greater than about 5%.

6. The paper of claim 4, wherein the improved compression strength and resistance is measured under conditions of high humidity.

7. The paper of claim 1 wherein the cellulose pulp has a ratio of aldehyde to carboxylic acid functionality of about 0.2 or more.

8. The paper of claim 1 wherein the paper is prepared by oxidizing the cellulose pulp with an oxidant having an equivalent oxidizing power of from about 0.05 to 5.0 g of active chlorine per 100 g of cellulose.

9. The paper of claim 8 wherein the oxidant is sodium hypochlorite of sodium hypobromite.

10. The paper of claim 9 wherein the amount of oxidant used is from about 0.1 to 10% by weight of sodium hypochlorite based on the weight cellulose and from about 0.1 to 5% by weight of sodium bromide based on the weight of cellulose.

11. The paper of claim 1 wherein the nitroxyl radical has the formula:

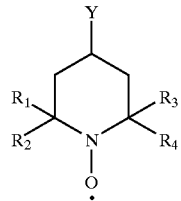

where Y is H, OH or NH—C(O)—CH$_3$: and $R_1$, $R_2$, $R_3$ and $R_4$ represent the same or different alkyl groups of 1 to 18 carbon atoms.

* * * * *